G. H. HUFF.
SCRAPER ATTACHMENT FOR WHEEL PLOWS.
APPLICATION FILED NOV. 21, 1911.

1,107,952.

Patented Aug. 18, 1914.

Inventor,
George H. Huff.
By Victor J. Evans,
Attorney.

Witnesses:
Christ Feinle, Jr.

UNITED STATES PATENT OFFICE.

GEORGE H. HUFF, OF SYRACUSE, NEW YORK.

SCRAPER ATTACHMENT FOR WHEEL-PLOWS.

1,107,952.  Specification of Letters Patent.  Patented Aug. 18, 1914.

Application filed November 21, 1911. Serial No. 661,498.

*To all whom it may concern:*

Be it known that I, GEORGE H. HUFF, a citizen of the United States, residing at Syracuse, in the county of Onondaga and State of New York, have invented new and useful Improvements in Scraper Attachments for Wheel-Plows, of which the following is a specification.

This invention relates to scraper attachments for wheel plows, and it has for its object to produce a scraper attachment of simple and improved construction which may be conveniently attached to almost any type of wheel plow for the purpose of scraping the wheels and getting the same free from adhering clods of dirt when the soil is sticky, damp or freezing.

A further object of the invention is to provide a simple and improved construction whereby the scraping device may be mounted upon the wheel carrying lever so as to be thereby held in engagement with the rim of the wheel at any angle to which the lever may be tilted for the purpose of adjusting the wheel.

A still further object of the invention is to produce an improved construction whereby the scraper blade may be conveniently adjusted to hold it in operative engagement with the rim of the wheel.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
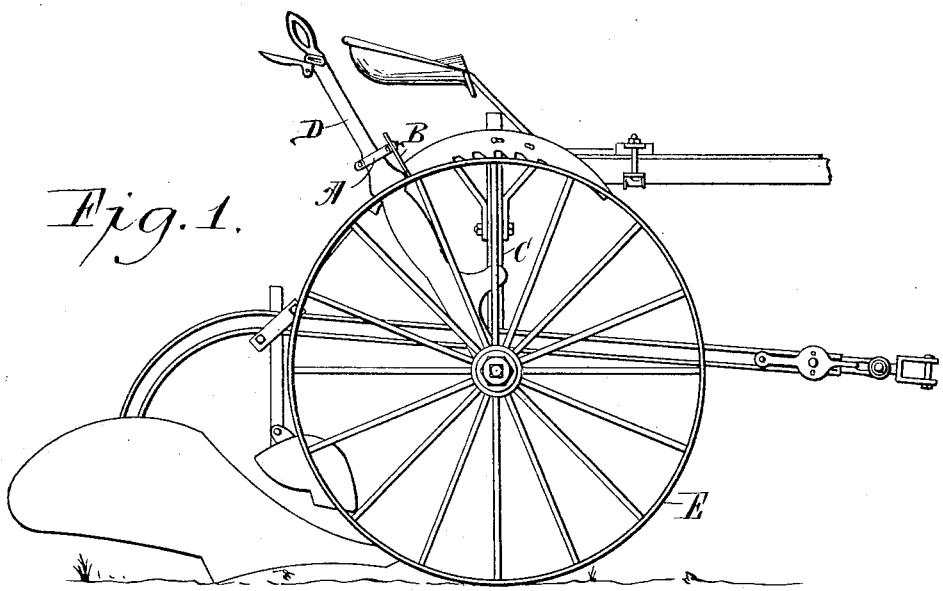
Figure 2:
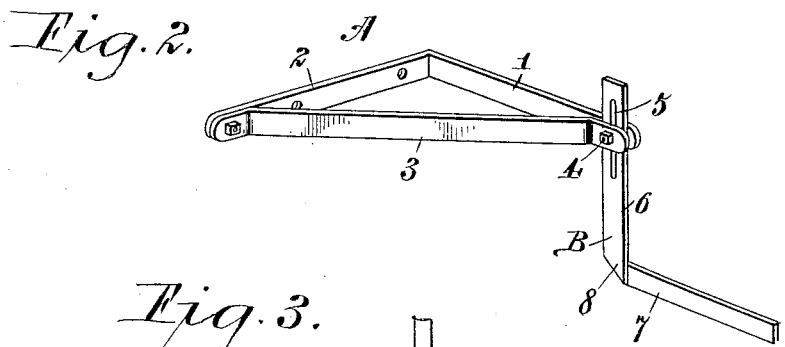
Figure 3:
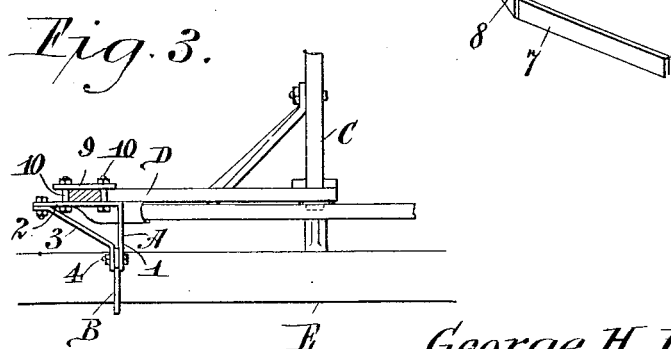

In the drawings, Figure 1 is a side elevation showing the near side of a wheel plow equipped with the improved attachment. Fig. 2 is a perspective view showing the scraper attachment detached. Fig. 3 is a plan view of the scraper attachment showing also the lever upon which it is mounted and a portion of the wheel engaged thereby, the lever being shown in section.

Corresponding parts in the several figures are denoted by like characters of reference.

In the construction of the improved attachment I provide a triangular bracket comprising an L-shaped member A, the arms of which 1 and 2 are connected together by means of a diagonal brace 3. Said brace is connected with the arm 1 which extends outwardly from the base 2 by means of a bolt 4 extending through a slot 5 in one arm 6 of an L-shaped member B, the other arm of which, 7, constitutes the wheel engaging scraper. As shown, the L-shaped member B may be composed of a single strip of steel which is bent or folded diagonally across, as shown at 8. The plow frame, a portion of which is shown at C, is equipped with a lever D carrying the wheel E. The scraper attachment is in practice secured upon the lever D by any suitable means, such, for instance, as a clip plate 9 and bolts 10, it being understood, however, that the scraper attachment may be mounted upon the lever by any suitable means which will permit it to be properly adjusted and positioned with reference to the wheel E, the rim of which is to be engaged by the scraper 7. It is evident that the scraper will remain in engagement with the rim of the wheel in any position to which said wheel may be adjusted by means of the lever. Wear upon the scraper may be compensated for, and minor displacements of the scraper may be corrected by loosening the bolt 4, whereby the scraper member B is clamped between the arm 1 and the brace 3, after which proper adjustment may be quickly made, and the bolt may then be retightened.

It will be readily seen that the improved attachment may be simply and inexpensively constructed and that it may be applied to the wheel carrying levers of many well known types of wheel plows in such a manner that the rims of the wheels will be engaged by the scraper members and will thereby be freed from adhering clods of clay and dirt, whether such clods adhere to the wheels by moisture or by freezing. The operation of a plow equipped with the improved attachment will be much facilitated, and it may be operated with less expenditure of power and with more satisfactory results.

Having thus described the invention, what is claimed as new, is:—

In combination with a wheel, a member projecting above and alongside of said wheel, an angle-iron strap having one face secured to said member, a diagonal strap, an angular offset formed upon said diagonal strap and secured to the free end of the secured part of said angle-iron strap, a second angular offset formed upon said diagonal strap arranged parallel with the opposite face of said first-named strap, an L-shaped member consisting of an arm twisted angularly relatively to another arm, one arm of said member, being disposed between and at right angles to the second-named face of said angle-iron strap and said adjacent offset, a bolt passing through said offset, arm and said strap, and a clamping nut on said bolt.

In testimony whereof I affix my signature in presence of two witnesses.

GEORGE H. HUFF.

Witnesses:
 G. G. MUNGER,
 MARIE NELSON.